Oct. 3, 1967  W. E. GOOD ET AL  3,345,462
LIGHT VALVE PROJECTION APPARATUS
Filed Oct. 16, 1963  3 Sheets-Sheet 1
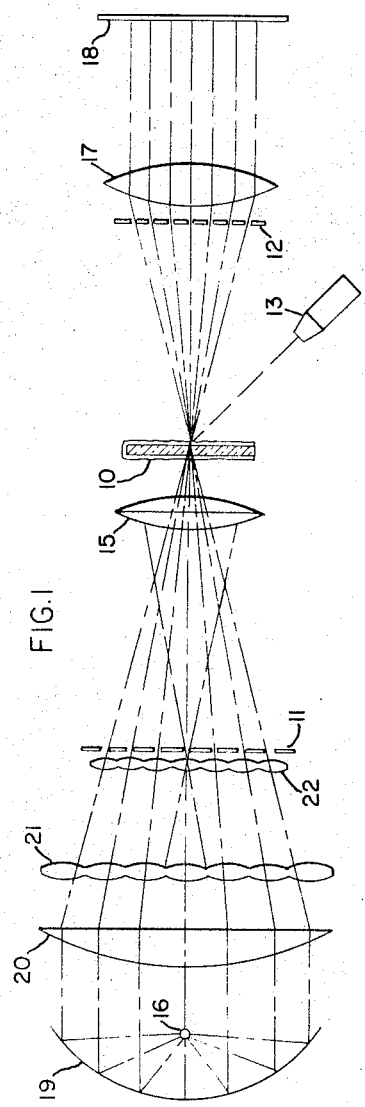
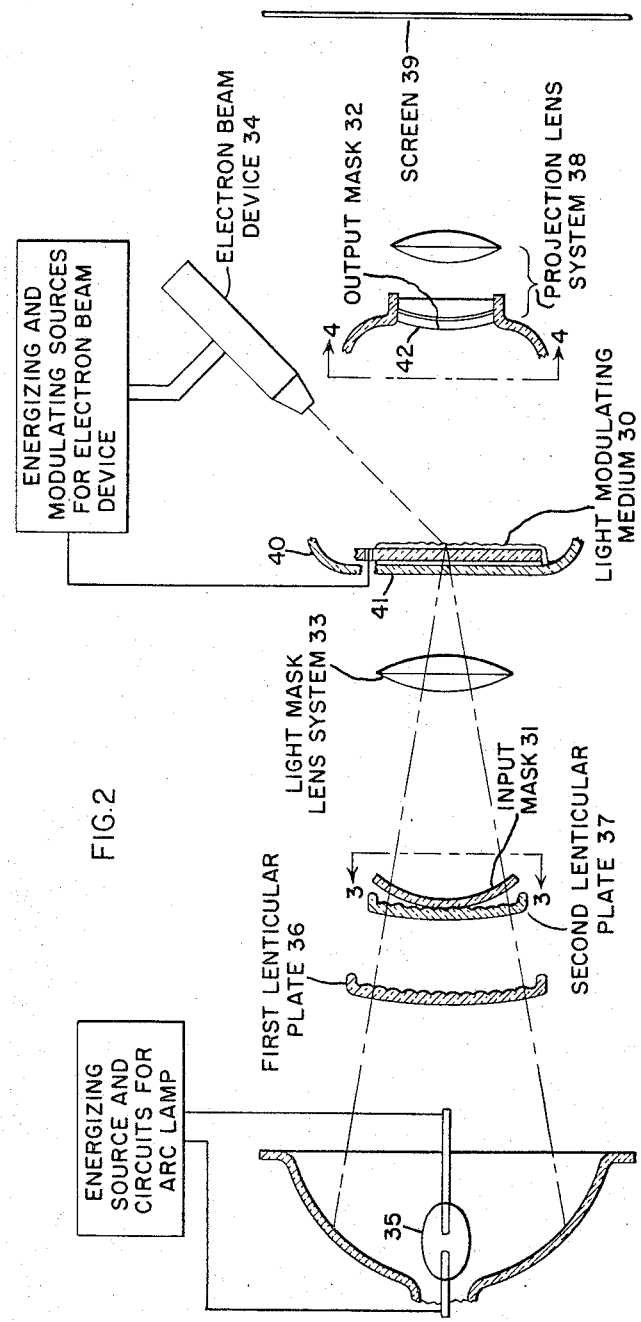
INVENTORS:
WILLIAM E. GOOD,
HENRY J. VANDERLAAN,
BY *Julius J. Zaskalicky*
THEIR ATTORNEY.

INVENTORS:
WILLIAM E. GOOD,
HENRY J. VANDERLAAN,
BY *Julius J. Zashesky*
THEIR ATTORNEY.

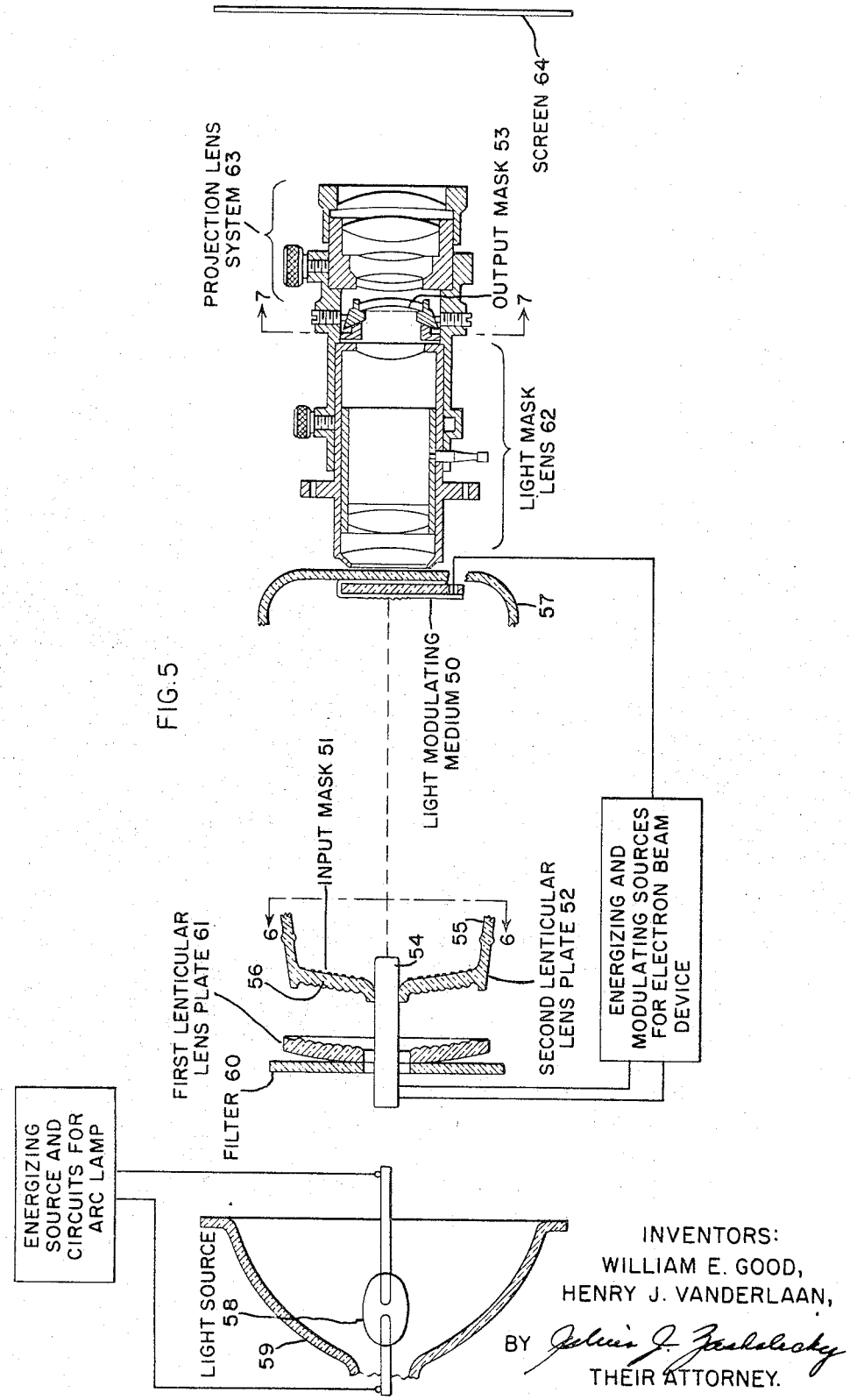

United States Patent Office 3,345,462
Patented Oct. 3, 1967

3,345,462
LIGHT VALVE PROJECTION APPARATUS
William E. Good and Henry J. Vanderlaan, Liverpool, N.Y., assignors to General Electric Company, a corporation of New York
Filed Oct. 16, 1963, Ser. No. 316,607
5 Claims. (Cl. 178—7.87)

ABSTRACT OF THE DISCLOSURE

Light valve projection apparatus wherein a pair of light masks having arrays of transparent and opaque areas are disposed on either side of a deformable medium which acts as a diffraction grating upon being swept by a scanning electron beam. The masks and the deformable medium coact to modulate light from a projection system so that images resulting from the electron beam scanning are subsequently projected onto a display screen.

---

The present invention relates to improvements in apparatus for the projection of images of the kind including a light modulating medium deformable into diffraction gratings by electron charge deposited thereon in accordance with electrical signals corresponding to the images.

One form of such apparatus comprises a pair of light masks including similar arrays of transparent and opaque portions, a light modulating medium of the character indicated located between the light masks, and a source of light. Such apparatus usually includes the following lens systems:

(1) A first system for directing light from the source through the openings of the first or input one of said masks onto the light modulating medium,
(2) A second system for imaging the light passed by the transparent portions of the first mask onto corresponding opaque portions of the second or output masks, and
(3) A third system for projecting an image of the light modulating medium on a screen.

The components of the first lens system are usually situated between the light source and the input mask. The components of the second lens system may be located either on the light input and light output side of the light modulating medium between the input and output masks. The components of the third lens system are usually located between the output mask and the screen.

In the absence of deformations in the modulating medium, light from the source is blocked by the output mask and does not reach the screen. When the surface of the light modulating medium is deformed by the deposition of an electron charge pattern thereon in response to electrical signals corresponding to an image to be projected, light incident on the medium is diffracted and passes through the transparent portions in the output mask onto the screen to form an image corresponding to the electrical signals.

The present invention is directed to providing improvements with respects to the manner of supporting and location of the light masks in the apparatus and to the combination of at least one of the masks with other components of the apparatus. Such provisions in accordance with the present invention result in improved performance of the apparatus as well as reducing the number of parts and simplifying the construction thereof.

Accordingly, it is an object of the present invention to provide image projection apparatus of improved performance.

It is also an object of the present invention to provide improvements in the arrangement of the components in image projection apparatus of the kind disclosed herein to improve the optical performance thereof.

It is also an object of the present invention to provide mask structures for use in image projection systems which are simple to construct.

It is another object of the present invention to arrange the components of image projection apparatus including at least one light mask in such a manner that a plurality of heretofore discrete components are physically combined, thereby reducing the number of parts to said apparatus, facilitating and maintaining alignment thereof, and concurrently improving the performance thereof.

It is another object of the present invention to provide a supporting structure for the masks of the apparatus which enable the masks to withstand not only considerable heating without altering the dimensions thereof, but also renders them relatively immune to mechanical damage and accumulation of foreign matter.

It is a further object of the present invention to form the masks integral with the reflective surface of the supporting structure to reduce reflections from said surface.

The novel features believed characteristic of the invention are set forth in the appended claims. The invention itself, together with further objects and advantages thereof may best be understood by reference to the following description taken in connection with the accompanying drawings, in which:

FIGURE 1 is a schematic diagram form of a portion of the image projection apparatus useful as background in explaining the present invention.

FIGURE 2 is a side view partially in section of a portion of the image projection apparatus embodying one form of the present invention.

FIGURE 5 shows a side view partially in section of light projection apparatus in accordance with another form of the present invention.

Figure 3:
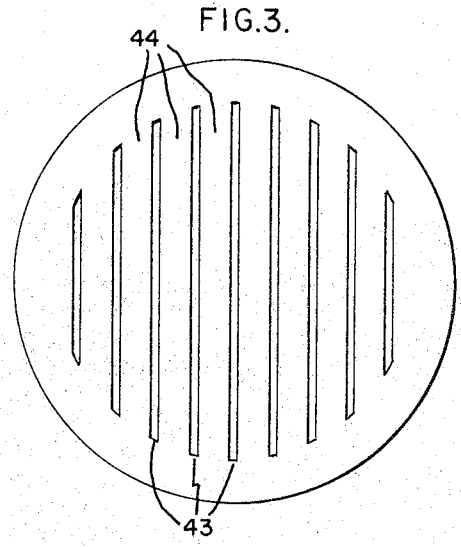
FIGURE 3 shows the light input mask of FIGURE 2 taken along section 3—3 thereof.

Referring now to FIGURE 1 there is shown in schematic form a portion of image projection apparatus such as would be useful as an optical channel of a television projection system. In the apparatus a light modulating medium 10 and a pair of light masks 11 and 12 are cooperatively associated to function as a light valve to pass light in response to electrical signals representative of the light intensity element by element of an image to be projected. The light modulating medium is light transmissive and adapted to be deformed into light diffraction gratings by means of electron charges deposited thereon by an electron beam device 13, for example. The input mask 11 has a plurality of transparent horizontally oriented slot portions separated by horizontally oriented opaque bar portions and the output light mask 12 consists of similarly oriented transparent slot portions separated by opaque bar portions. A lens system 15 is provided for imaging the transparent slot portions of the input mask 11 onto corresponding opaque portions of the output mask 12 in the absence of deformations in the light modulating medium. The light modulating medium 10 is situated with its faces generally perpendicular to the path of the light from the input mask to the output mask. The electron beam device 13 is arranged to form light diffraction gratings in which the valleys or lines thereof are parallel to the direction of the transparent slots and perpendicular to the direction of light from the input mask to the output mask.

Light from a source 16 is directed through the input mask onto the light modulating medium. In the absence of electrical signals applied to the electron beam device all of the light passed by the input mask is blocked by the output mask. Upon the application of electrical signals to the electron beam device, diffraction gratings are produced in the light modulating medium which deflected the light orthogonally with respect to the direction of the lines in the diffraction grating thereby producing deviation of the light incident on the light modulating medium so as to pass through corresponding slots in the output mask. The intensity of the light passed by the output mask varies in accordance with the depth of the valleys or lines which in turn is a function of appropriate modulation, for example, amplitude modulation of the electron beam of the device 13. The light passed by the output mask is then imaged by a projection lens 17 onto a screen 18 for viewing.

In such a system light from a source must be efficiently and with a high degree of uniformity applied over the active area of the light modulating medium. Apparatus for fulfilling such requirements usually include in addition to a source of light, a suitable reflector and a lens system for imaging the light from the source through the slots in the input mask onto the active area of the light modulating medium.

Such is provided by a parabolic reflector 19, a condensing lens 20, first 21 and second 22 lenticular lens plates. Light from the source 16 is directed by the parabolic reflector 19 and condensing lens 20 onto the light modulating medium 10 through the various slots in the input light mask 11. On the minimal optical paths from the light source to the light modulating medium are located pairs of lenticules, one lenticule from each of the lenticular plates 21 and 22. Each of the lenticules on the first plate 21 functions to image the source 16 of light onto a respective element of a slot in the input mask 11. Each of the lenticules on the second plate 22 functions to image a respective lenticule on the first lenticular plate 21 onto the active area of the light modulating medium to provide efficient and uniform illumination thereof from the source of light.

As an electron beam is utilized to produce deformations in the light modulating medium an evacuated enclosure having a light input and light output window must be provided for at least the light modulating medium and the electron beam device. The enclosure may embrace components in addition to the light modulating medium and electron beam device. The light modulating medium may be located either at the input or output window of the enclosure. The light mask lens elements must be located between the input and output mask, and, of course, the light modulating medium must also be located between the two masks. However, the light mask lens elements may be located on either side of the light modulating medium so long as the lenses perform the function of imaging the light from the slots in the input mask onto corresponding bars or slots on the output mask. Thus a certain flexibility in the position of the light modulating medium and the light mask lens is inherently possible in the apparatus described. While the input light mask is shown as a planar element and similarly the light output mask is shown as a planar element, it will be appreciated by those skilled in the art that the input and the output masks may have predetermined curvatures matched to curvature of field of the mask lens system, thereby simplifying the lens design in that little, if any, correction need be introduced in the lens system for the curvature of field aberration.

As the optical channel of the apparatus includes a large number of components, the light efficiency of each of the components is important. Preferably, it is desirable to provide in the components a capability to perform a plurality of functions. Improving the efficiency of the system not only reduces the size of light source needed but also reduces the heat dissipation and the need for cooling in the components such as the input and output masks. Combining of functions in a single physical component also reduces the number of reflective surfaces in the apparatus thereby avoiding undesired reflections and hence improving not only the efficiency of the apparatus but also the faithful rendition of the image to be projected.

The presence of the output mask in the path of light from the light modulating medium to the projection lens affects the resolution of the projected image. Such adverse effects can be minimized by locating the projection lens as close to the output mask as is physically possible as is provided in accordance with the embodiments to be described.

Referring now to FIGURE 2 there is shown a television projection apparatus similar to the projection apparatus shown in schematic form in FIGURE 1. The apparatus includes a light modulating medium 30 on the light input side of which is located a light input mask 31 of metallic material and on the light output side of which is situated a light output mask 32 also of metallic material. The light mask lens system 33 is located on the light input side of the light modulating medium. An electron beam device 34 is provided for producing the physical changes in the light modulating medium for modulating the light incident thereon. On the light input side of the light modulating medium are also located a light source 35 and a pair of lenticular lens plates 36 and 37, the latter of which is located adjacent the light input mask and functions to efficiently and uniformly illuminate the light modulating medium. On the light output side of the light modulating medium is located a projection lens system 38 which functions to image the light modulating medium onto a screen 39. An enclosure 40 having an input window 41 located at the light modulating medium and an output window 42 located at the output mask location in the optical channel is also provided. The light output mask is formed on the rear surface of the first element of the projection lens which also functions as the light output window of the enclosure.

FIGURE 3 shows a face of the light input mask 31 as viewed from the front of the apparatus. In this figure are shown a plurality of parallel transparent slots 43 each spaced from one another by similarly oriented parallel opaque bars 44.

Figure 4:
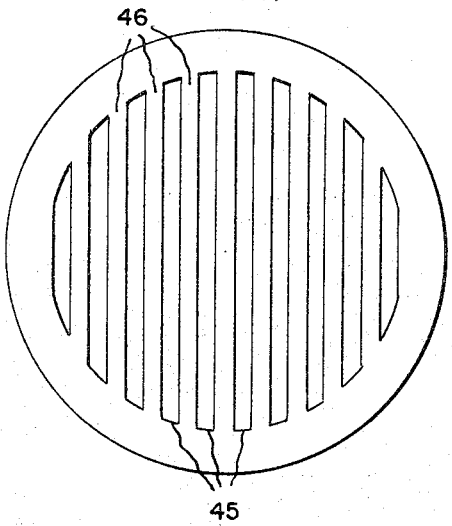
FIGURE 4 shows a view of the output mask of the apparatus of FIGURE 2 taken along section 4—4 thereof.

FIGURE 4 shows the output light mask when viewed from the rear of the apparatus and consists of a plurality of transparent slots 45 and bars 46 similar to the slots and bars of the input light mask and aligned therewith in the manner described above. It should be noted that the input mask 31 is convex with respect to the rear of the apparatus and that the output mask 32 is also convex with respect to the rear of the apparatus and that the curvature of the input mask is greater than would be the case were the output mask planar or of concave curvature as viewed from the rear of the apparatus. In this arangement the output light mask 32 is integrally formed on the first element of the projection lens system 38 by any of a variety of deposition techniques known to the art thus imposing the increased curvature requirement on the input mask 31. Such a location eliminates the need for a separate support for the output mask in such forms as a peripheral ring or in the form of a transparent member on which the masking bar portions are formed. In addition, the first lens element of the projection lens system constitutes the output window 42 of the vacuum enclosure. Thus in effect three functions have been combined in one component. In addition, the location of the projection lens system 38 close to the output mask improves the resolution of the apparatus.

Referring now to FIGURE 5 there is shown another apparatus similar to the projection apparatus of FIGURE 1. The apparatus includes a light modulating medium 50 on the light input side of which is located a light input mask 51 formed on the face of a lenticular plate member 52 adjacent to the light modulating medium and on the output side of which is located a light output mask 53. An electron beam device 54 is provided for producing diffraction gratings in the light modulating medium. The lens plate member 52 forms the input window 56 of the envelope 55, the output window 57 of which is located at the light modulating medium. The member 52 is of convex aspect as viewed from the rear of the apparatus and has on the rear face thereof a plurality of lenticules which function as a part of the light input lens system and on the opposite surface thereof adjacent to the light modulating medium are deposited the opaque bars to form the input light mask. The member 52 functions as a part of the light input lens system, as the input vacuum window, and as the light input mask. Such a member is relatively easy to make and eliminates two support arrangements, one for the lenticular lenses and one for the input mask and also eliminates the alignment problem as between these members, and also between the electron beam device in relation to other components of the apparatus. The juxtaposition of the lenticular lenses and the input mask in the lens plate 52 provides improved light efficiency. The convex aspect of the member 52 as part of the entire evacuated enclosure provides a sturdy structure which is able to withstand well atmospheric pressure and also fulfills part of the field curvature requirements of the light mask lens system. The location of the input mask bars on a heat resistant glass member 55 having a low thermal coefficient of expansion avoids the adverse effects of heat dissipation in this high energy level portion of the apparatus. While the lens plate 52 is shown lenticular in some systems it may be found expedient to make such plate plain. Such a plain structure would very likely be less efficient and dissipate more heat, thus making it more imperative to form the input mask integral therewith. In the apparatus of FIGURE 5 the light modulating medium in the form of an oil covers the supporting transparent member thereof and the space between the supporting member and the output window, thus avoiding obscuring the output window by foreign particles. Foreign particles such as vapor deposits of the oil and dust particles on the output window would impair the quality of the image of modulated area of the light modulating medium projected onto the screen. In the same apparatus, location of the input mask at the input window and inside the enclosure renders the input mask immune to external contamination. Internal contamination, if any by vapor deposits from the light modulating oil is more tolerable than at the output window in that the effect of such deposits would be in the main to reduce slightly input light efficiency.

The light input side of the optical channel also includes a source of light 58, an elliptical reflector 59 which functions to image the light source 58 on the light modulating medium 50, a dichroic filter element 60 having a central portion passing light of a pair of primary colors, for example, red and blue, and a pair of side portions adapted to pass a third primary color, for example, green and another spherical shell member 61 convex as viewed from the rear of the apparatus having lenticules thereon cooperatively associated with lenticules of the first mentioned plate 52 in a manner to perform efficient illumination of the light modulating medium as described above and more completely described in patent application Ser. No. 316,606, now Patent No. 3,330,908, filed and assigned to the same asignee as the present invention.

A lens system 62 consisting of four elements is also situated on the light output side of the light modulating medium and functions to image the light input mask 51 on the light output mask 53. Also situated on the light output side of light modulating medium is a projection lens 63 arrangement which functions in cooperation with the four element light mask lens system to image the light modulating medium 50 on a screen 64. With such an arrangement the projection lens system is closely spaced with respect to the output mask and thereby provides improved resolution over a system in which the lens is more remotely situated from the output light mask. The light mask lens system and the projection lens system are described in patent application Ser. No. 336,505, now Patent No. 3,328,111, filed and assigned to the assignee of the present invention.

Figure 6:
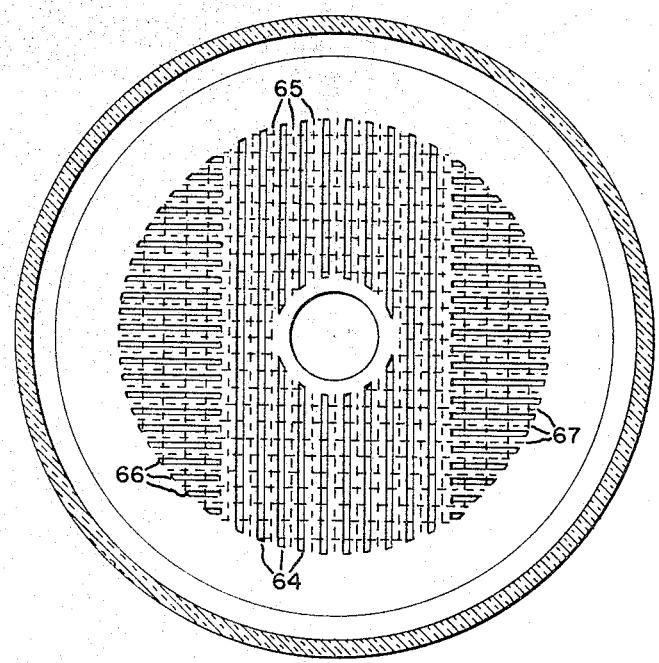
FIGURE 6 shows the input light mask of the apparatus of FIGURE 5 taken along section 6—6 thereof.

In FIGURE 6 member 55 is shown as viewed along section 6—6 of FIGURE 5 including a plurality of parallel vertically oriented transparent slots 64 and opaque bars 65 in a vertical central section of the mask and showing on sectors of each side of the central portion a plurality of parallel horizontally oriented transparent slots 66 and opaque bars 67. The system is adapted for the rendition of images in color on the basis of variation in the intensity picture element by picture element of a plurality of primary color components. The vertically oriented slots and bars are utilized with a pair of primary color components and the horizontal slots and bars are utilized in connection with the third primary color component as filter element 59 is arranged so as to pass the desired color components through the desired sections of the light input mask.

Figure 7:
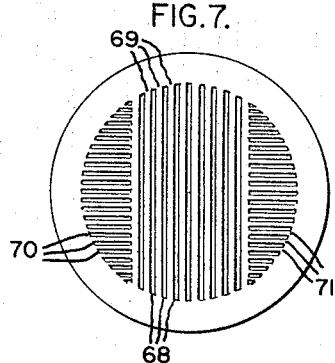
FIGURE 7 shows a side view of the output light mask of the apparatus of FIGURE 5 taken along section 7—7.

FIGURE 7 shows the light output mask as viewed along section 7—7 of FIGURE 5. It should be noted that the light output mask is concave as viewed from the rear of the apparatus. The light output mask has a central section of vertically oriented slots 68 and bars 69 and two segments on each side of the central section each having a plurality of horizontally oriented slots 70 and bars 71. The output light mask is adjusted with rspect to the input light mask such that in the absence of modulation in the light modulating medium the vertically oriented input slots are imaged by the lens system on vertically aligned bars on the light output mask and that horizontally oriented slots in the light input mask are imaged on horizontally oriented bars in the light output mask. The input and output light masks function in association with the light modulating medium in the manner indicated in connection with the apparatus of FIGURE 1 to selectively pass light in accordance with an electrical signal representative of the image to be projected. To facilitate fabrication and support thereof the light output mask may be formed by the deposition of a metallic material by techniques well known in the art in the desired configuration on a transparent support member.

While the invention has been described in specific embodiments it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. Apparatus for projection of images in response to electrical signals corresponding to said images comprising a pair of light mask members each including similar arrays of transparent and opaque portions, a light modulating medium deformable into light diffraction gratings by electron charge patterns thereon located between said members, means for forming said charge patterns thereon in response to said signals, an evacuated enclosure surrounding said medium and said charge pattern producing means and having an input window portion for permitting illumination of said medium by said source and an output window portion for passing light from said medium, a source of light, a first projection means for illumination of said medium from said source through the transparent portions of the input one of said members, second projection means for projecting light from the transparent portions from said one member onto corresponding opaque portions of the other of said members in the absence of any deformation of said medium, third projection means for projecting an image of said medium onto a screen, said one member being formed on the interior portion of the input window of said enclosure.

2. Apparatus for projection of images in response to electrical signals corresponding to said images comprising a pair of light mask members each including similar arrays of transparent and opaque portions, a transmissive light modulating medium deformable into light diffraction gratings by electron charge patterns thereon located between said members, means for forming said charge patterns thereon in response to said signals, an evacuated enclosure surrounding said medium and said charge pattern producing means and having an input window portion for permitting illumination of said medium by said source and an output window portion for passing light from said medium, a source of light, a first projection means for illumination of said medium from said source through the transparent portions of the input one of said members, second projection means for projecting light from the transparent portions from said one member onto corresponding opaque portions of the other of said members in the absence of any deformation of said medium, said members being concave in respect to said modulating medium, a third projection means for projecting an image of said medium onto a screen, said one member being formed on the interior portion of the input window of said enclosure, said modulating medium located contiguous to said output window.

3. Apparatus for projection of images in response to electrical signals corresponding to said images comprising a pair of light mask members each including similar arrays of transparent and opaque portions, a transmissive light modulating medium deformable into light diffraction gratings by electron charge patterns thereon located between said members, means for forming said charge patterns thereon in response to said signals, an evacuated enclosure surrounding said medium and said charge pattern producing means and having an input window portion for permitting illumination of said medium by said source and an output window portion for passing light from said medium, a source of light, a first projection means for illumination of said medium from said source through the transparent portions of the input one of said members, second projection means for projecting light from the transparent portions from said one member onto corresponding opaque portions of the other of said members in the absence of any deformation of said medium, a third projection means for projecting an image of said medium onto a screen, said medium located contiguous to said input window, said other member being formed onto the interior surface of the output window of said enclosure.

4. Apparatus for projection of images in response to electrical signals corresponding to said images comprising a pair of light mask members each including similar arrays of transparent and opaque portions, a transmissive light modulating medium deformable into light diffraction gratings by electron charge patterns thereon located between said members, means for forming said charge patterns thereon in response to said signals, an evacuated enclosure surrounding said medium and said charge pattern producing means and having an input window portion for permitting illumination of said medium by said source and an output window portion for passing light from said medium, a source of light, a first projection means for illumination of said medium from said source through the transparent portions of the input one of said members, second projection means for projecting light from the transparent portions from said one member onto corresponding opaque portions of the other of said members in the absence of any deformation of said medium, third projection means for projecting an image of said medium onto a screen, said members being concave with respect to said modulating medium means and forming the input window of said enclosure.

5. Apparatus for projection of images in response to electrical signals corresponding to said images comprising a pair of light mask members each including similar arrays of transparent and opaque portions, a transmissive light modulating medium deformable into light diffraction gratings by electron charge patterns thereon located between said members, means for forming said charge patterns thereon in response to said signals, an evacuated enclosure surrounding said medium and said charge pattern producing means and having an input window portion for permitting illumination of said medium by said source and an output window portion for passing light from said medium, a source of light, a first projection means for illumination of said medium from said source through the transparent portions of the input one of said members, second projection means for projecting light from the transparent portions from said one member onto corresponding opaque portions of the other of said members in the absence of any deformation of said medium, third projection means for projecting an image of said medium onto a screen, said modulating medium located contiguous to said input window, said other member being convex with respect to said second projection means, said other member being integral with the input surface of the first element of said third projection means, and said first element of said third projection means forming the light output window of said enclosure forming the light output window of said enclosure.

References Cited

UNITED STATES PATENTS

| | | | |
|---|---|---|---|
| 2,335,659 | 11/1943 | Fraenckel et al. | 178—7.87 X |
| 3,016,417 | 1/1962 | Mast et al. | 350—161 X |
| 3,041,395 | 6/1962 | Mast | 178—7.88 |
| 3,263,029 | 7/1966 | Rosenthal | 178—7.5 X |

JOHN W. CALDWELL, *Acting Primary Examiner.*

R. L. RICHARDSON, *Assistant Examiner.*